United States Patent [19]

Tanner et al.

[11] 4,074,311
[45] Feb. 14, 1978

[54] TELEVISION SECURITY SYSTEM

[75] Inventors: James L. Tanner, Reseda; Bruno A. Rist, Northridge, both of Calif.

[73] Assignee: Tanner Electronic Systems, Van Nuys, Calif.

[21] Appl. No.: 697,507

[22] Filed: June 18, 1976

[51] Int. Cl.² .............................................. H04N 1/44
[52] U.S. Cl. ..................................... 358/118; 358/121
[58] Field of Search ............................... 358/118–121; 325/132

[56] References Cited

U.S. PATENT DOCUMENTS

| | | | |
|---|---|---|---|
| 2,905,747 | 9/1959 | Kidd et al. | 358/118 |
| 3,202,758 | 8/1965 | Brownstein | 358/118 |
| 3,347,982 | 10/1967 | Bass et al. | 358/118 |
| 3,760,097 | 9/1973 | Burroughs et al. | 358/114 |
| 3,896,262 | 7/1975 | Hudspeth et al. | 358/118 |

*Primary Examiner*—S. C. Buczinski

*Attorney, Agent, or Firm*—Herzig & Walsh, Incorporated

[57] ABSTRACT

A system for subscription TV security which is comprised of a scramble signal generator which adds a modulated RF carrier signal to the TV channel transmission. Preferably the frequency of the scramble signal generator is selected to fall within the band of frequencies of the TV channel between the video carrier and the audio carrier. The TV channel is transmitted to receivers encoded with the scramble signal carrier providing false and misleading information, preventing the receiver from reconstituting a coherent picture or sound while this scramble signal is present. The transmitted signal is decoded, (i.e. scramble signal removed), restoring regular reception by filtering with a sharply tuned high-Q notch filter attached to the drop line going to a TV receiver. By careful selection of the band width and attenuation of the filter and pre-emphasis of the channel band, degradation of the video information is prevented.

45 Claims, 9 Drawing Figures

TELEVISION SECURITY SYSTEM

BACKGROUND OF THE INVENTION

This system relates to television jamming systems and more particularly relates to systems for encoding and decoding television transmissions for subscription TV.

The need for practical systems offering security for pay TV has become increasingly apparent. Both active and passive systems have been developed and are marketed at present which are designed to prevent non-subscribers from watching pay TV premium channels. Some of the accepted systems include trapping at the pole, converters, switchable taps, and various encoding-decoding systems. In general, the cost of these systems is directly proportional to the degree of security they offer. It seems fair to say, however, that there is no fully secure system and the present systems have not achieved wide acceptance. Still, it remains necessary to secure pay TV transmissions to some extent in order to make pay TV a realistic business proposition.

SUMMARY

The purpose of the present invention is to provide a system which can provide security for a subscription TV efficiently and economically.

The present invention comprises adding a scramble signal carrier to the TV channel band somewhere between the video carrier and the audio carrier which is controlled in amplitude, frequency, and modulation to render TV reception unintelligible. This signal is added to the TV transmission preferably at the point of origin or the head end of a CATV installation. When the TV transmission is received at a TV set, the receiver is unable to reconstitute a coherent picture or sound. With the addition of a decoder or descrambler in the form of a sharply tuned LC notch filter the scramble signal may be removed before processing, restoring a TV receiver to regular reception.

The system of the present invention offers a novel solution to the problem of pay TV security. Its theoretical foundation is clear and concise, its implementation is ideally suited to high technology mass production, resulting in low cost to the user. The system is universally applicable, i.e. it will function not only in CATV, but in MDS (Multipoint Distribution System) and over the air systems as well. The system is equally adaptable to any presently known television system because the basic principle remains the same. Thus, regardless of polarity of modulation, number of lines, bandwidth, etc., the system can be adapted to any television system by making minor modificatons in a similar manner as modifications are made to permit use with any channel of NTSC (National Television Standards Committee) system used in the U.S.

It is one object of the present invention to provide a system for securing a TV channel transmission for reception by only those who subscribe to the system.

Another object of the present invention is to provide a TV channel encoding security system which is relatively simply in design.

Yet another object of the present invention is to provide a TV encoding security system which has high reliability and serviceability.

Still another object of the present invention is to provide a TV channel encoding security system with a carefully controlled scramble signal or signals.

Still another object of the present invention is to provide a TV encoding security system which minimizes the effects of decoding by pre-emphasizing the video information.

Other objects, advantages and novel features of the invention will become apparent from the following detailed description of the invention when considered in conjunction with the accompanying drawings wherein like reference numbers identify like parts throughout.

DETAILED DESCRIPTION OF THE PEFERRED EMBODIMENT

It is well known that a TV receiver will detect as video information the presence of a single frequency sinosoidal signal, located between the visual and aural carriers of a TV channel. When such a signal is not part of the regular picture material, it will be observed as interference, or disturbance of the intended picture.

The degree of disturbance by this interference signal primarily depends on the combination of:

1. The level of the signal relative to the visual and aural carriers.
2. Frequency of the interfering signal, i.e. the position of this signal in the frequency domain relative to the visual and aural carriers.
3. Modulation of the interfering signal.

The threshold of interference by the interfering or scrambling signal is a strong function of the signal's frequency and modulation. Considering a pure sinosoidal RF scrambling signal, however, it was determined that the threshold of interference is at the −45 dB level with respect to the visual carrier, when the scrambling signal is anywhere between the visual and aural carriers. The degree of interference by the scrambling signal becomes more severe with increasing level, and the picture is greatly imparied at the 0 dB level.

In general, for a given relative level of the scrambling signal, the picture quality becomes more objectionable as the scrambling singal is moved closer in frequency to the visual carrier. The sound quality is degraded in a similar fashion when the scrambling signal is moved close in frequency to the aural carrier. There are also frequencies which are more effective in disrupting picture and sound reception than others; e.g. if the scrambling signal is harmonically related to the line scanning frequency (15.734 KHz) and/or the carrier frequencies, TV reception is of much poorer quality than if some other frequencies are chosen.

Modulation of the scrambling signal increases the level of interference with TV reception. AM modulation was found to be generally more effective than FM, and modulating frequencies below 100 Hz result in greater scrambling of the picture material than if some other frequencies were used.

It can be seen from the preceding brief analysis that a proper choice of the encoding or scrambling signal, i.e. one of a certain level, a selected frequency, and one which is AM modulated, will make enjoyable TV reception impossible.

Figure 1A:
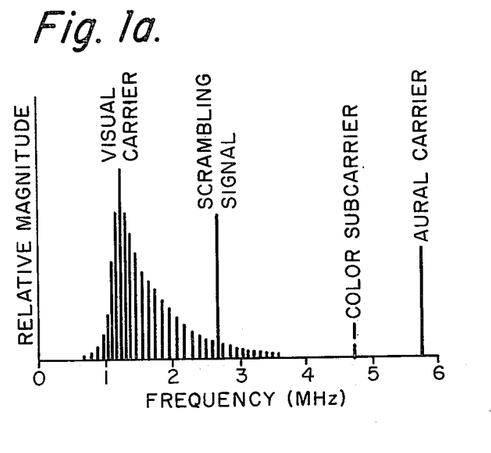
FIG. 1a is a graphical illustration of a typical TV channel frequency spectrum with a scrambling signal carrier added.
Figure 1B:
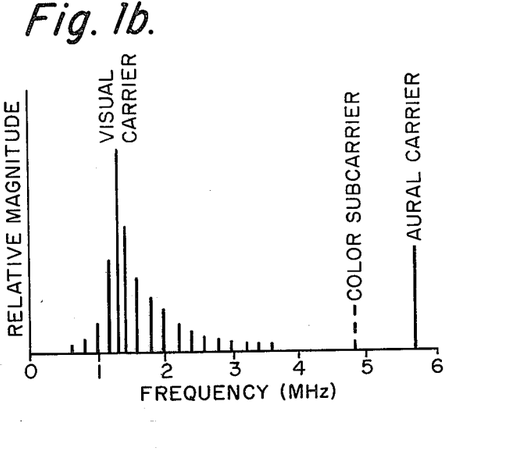
FIG. 1b is a graphical illustration of a typical TV channel frequency spectrum with the scrambling signal removed.

Among the novel features incorporated in the system is the ability to inject and then remove an in-channel single frequency interference, such as an encoding signal, by means of a sharply tuned notch filter. If the notch filter, or decoder descrambler, attenuates the scrambling signal to approximately the −45 dB level, TV reception is acceptable in most cases. FIGS. 1a and 1b depict schematically the frequency spectrum of a TV channel with a scrambling signal present between the video and audio carriers and with the scrambling signal removed respectively.

In FIGS. 1a and 1b the frequency scale of 6 MHz indicates the band width allocation for each channel with the visual carrier at 1.25 MHz, the coller subcarrier at 4.83 MHz and the aural carrier at 5.75 MHz above the lowest frequence of the band. In each of the graphical illustrations FIGS. 3, 5, 6, 7a and 7b the same rule will apply, i.e. the frequency scale represents any channel bandwidth allocation of 6 MHz.

In practice, it is not possible to remove a single frequency. The decoder or notch filter of the invention removes a narrow band of frequencies about the undesired signal. This means, of course, that a small amount of regular picture material is removed from the transmission along with the interfering signal. Thus the in channel notch filter or decoder, must be stable, efficient and accurate.

The principle of the system is the insertion of one or more scrambling or carrier signals, into a particular TV channel between the visual and audio carriers, thereby obliterating (i.e. interfering with) the received picture and sound. The reception may be restored, descrambled, or more correctly decoded, for a subscriber by removing the false and misleading scrambling signal(s) at the TV set.

Figure 2:
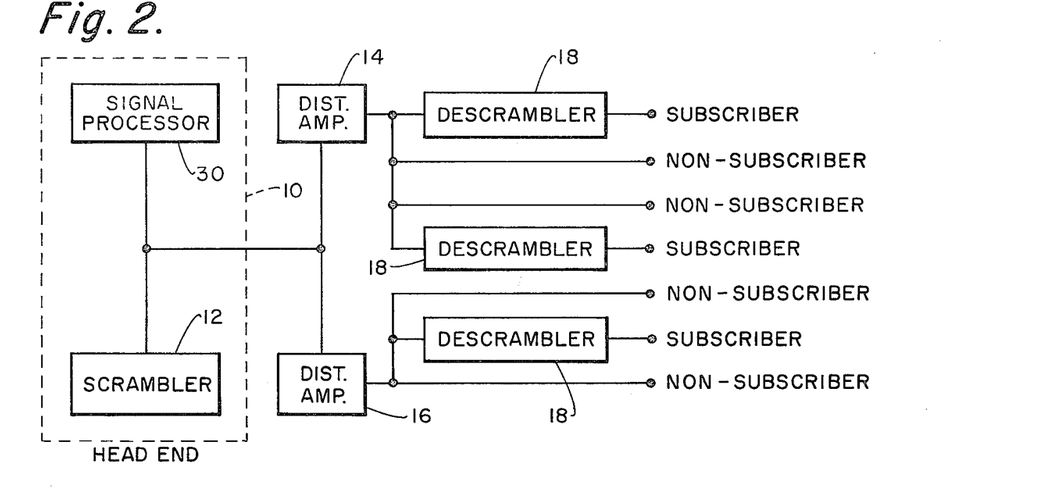
FIG. 2 is a block diagram of a typical CATV system equipped with the encoder.

The scrambling signal is generated by the encoder 12 which is located typically at the point of origin or at the head-end 10 of a CATV facility, as shown. The output of the head-end 10 with the scramble or enclding signal is delivered to distribution amplifiers 14, 16 and then to TV receivers (not shown). All TV sets will receive normal reception except one preselected channel will be rendered unintelligible by the misleading information from the interfering carrier or encoding signal. Those who wish to enjoy the scrambled channel will subscribe and have a decoder or descrambler 18, which will be more fully described hereinafter, installed in their line. Non-subscribers will be able to receive other channels normally, but may not view the channel with the scrambled display.

If it is desired to scramble a channel for purposes of pay TV security, the preferred choice of parameters for the encoding signal which will render reception unenjoyable without the use of the decoder unit are as follows:

1. A frequency difference of 2.257 MHz ± 1KHz between the scrambling signal carrier and visual carrier.
2. A 0 db relative level between the scrambling signal carrier and the visual carrier.
3. A 15 Hz Am and 1 Hz AM modulation of the scrambling signal carrier.
4. An 80% modulation of the scrambling RF signal.

Figure 3:
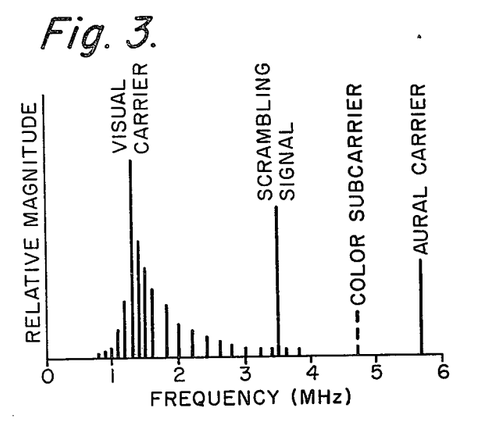
FIG. 3 is a graphical illustration of a typical TV channel frequency spectrum with the scrambling signal carrier added approximately mid-way between the video and audio carriers.

It can be noted from this data that the scrambling signal carrier is very nearly midway between the channel visual and audio carriers as shown in FIG. 3. The parameters disclosed above are of course, for NTSC applications here in the United States and are given by way of example only. For other systems, used in Europe, Asia and the Far East, some minor modifications would have to be made (e.g. frequency requirements) in a similar manner as modifications, are made to adapt the system to different channels of the NTSC system.

Investigation indicates that this choice of parameters is preferred and is one of several which will function well in the system. In this instance, the scrambling signal provides false and misleading information to the television receiver and has the following effect on TV reception:

1. The 2.257 MHz signal is detected and amplified along with regular video information by the TV set. Because of the 1 KHz AM modulation the interference appears as a set of horizontal bars across the receiver screen. The 15 Hz AM modulation interferes with the automatic gain control (AGC), color information, and vertical synchronizing pulses, thus causing the picture to roll and jump.
2. The beats and harmonics generated by the video detector become part of the 4.5 MHz sound information. The 1 KHz AM modulation, passing through the limiters, is detected and amplified by the audio circuits such that the 1 KHz tone from the speakers overrides regular sound material. Additionally, the 15 Hz AM modulation is audible as a "chirping" sound.

This frequency of 2.257 MHz interleaves the scrambling signal between harmonics of the scanning frequency, which arrangement facilitates the eventual descrambling process. This frequency difference of 2.257 MHz also positions the scrambling signal away from the chroma information, so that colors are not impaired after processing through the decoder.

Figure 4:
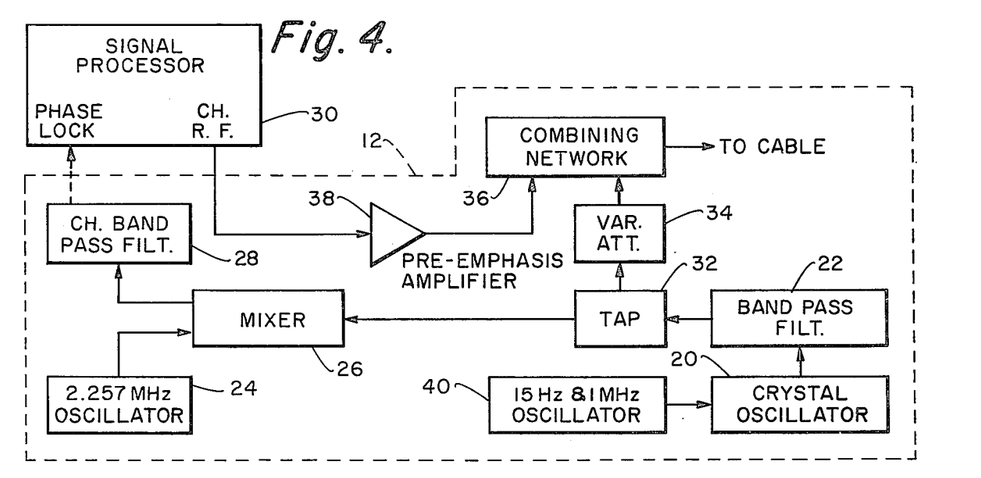
FIG. 4 is a schematic block diagram illustrating the encoder or scramble signal generator and its connection to a TV channel processing system.

FIG. 4 is a block diagram of the encoding unit 12 and the connections to other parts of a typical CATV head-end installation. The scramble signal frequency is generated by a crystal controlled rf oscillator 20 and modulated by oscillator 40. The crystal is maintained in an oven for added stability. A series of band pass filters 22 reduce the harmonic content to −70 dB with respect to the fundamental. Another highly stable crystal oscillator 24, operating at 2.257 MHz, is used to produce a reference for the visual carrier. This 2.257 MHz signal is then combined in mixer 26 with the scrambling signal from tap 32, and it is to this frequency, i.e. the scramble signal frequency minus 2.257 MHz, that the visual carrier of the channel is phase locked within signal processor 30 after passing through filter 28. (Connection of band pass filter 28 to signal processor 30 for phase locking is shown dotted because, though preferred, it is optional.)

The phase locking is preferred because it insures that the 2.257 MHz frequency difference will remain constant for the system.

Figure 5:
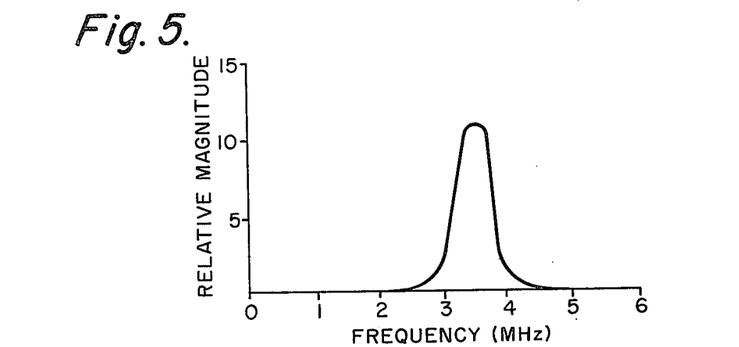
FIG. 5 is a graphical illustration showing the typical frequency response of an amplifier for pre-emphasizing the video information in a TV channel.
Figure 6:
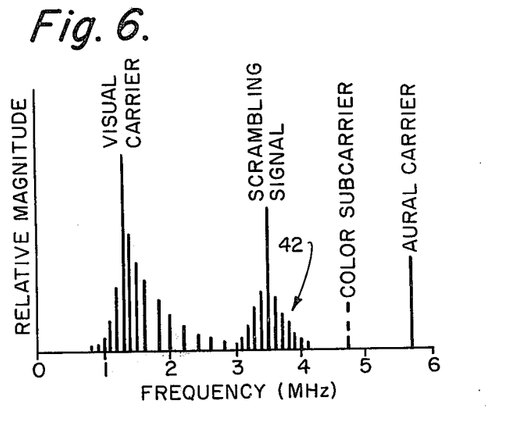
FIG. 6 is a graphical illustration of a typical TV channel frequency spectrum with the scrambling signal and the pre-emphasized portion of the transmitted RF band.

The pre-emphasizing amplifier 38 processes the rf band containing the channel in such a way as to counterbalance most of the degradation anticipated from the decoding process. It amplifies the band symmetrically about the scramble signal frequency point as shown at 42 of FIG. 6. FIG. 5 shows the frequency response of the pre-emphasizing amplifier, providing approximately 12 dB gain at the scramble signal frequency.

The pre-emphasized channel band is then combined with the scrambling signal and is coupled into the cable system via an impedance matching device 36. The frequency spectrum of the transmitted rf band with the scrambling signal and pre-emphasis amplification is pictured in FIG. 6.

The descrambling process consists of removing the scrambling signal from the channel rf band. This is accomplished by connecting a descrambler unit 18 (FIG. 2) into the subscriber's drop line.

Figure 7A:
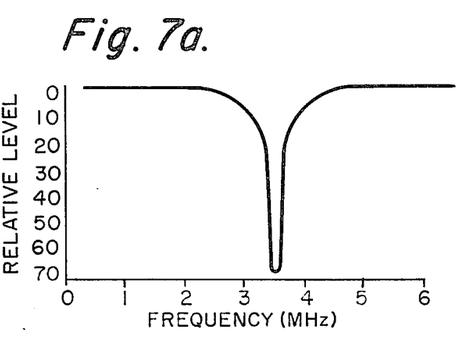
FIG. 7a is a graphical illustration showing the typical frequency response of the decoder.
Figure 7B:
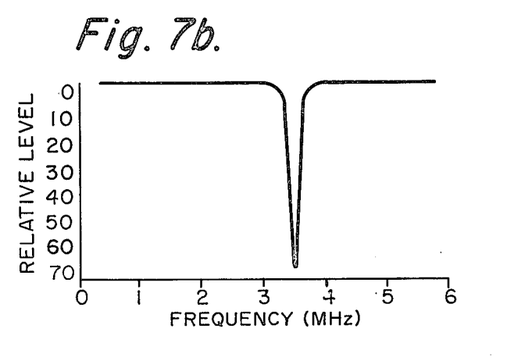
FIG. 7b is a graphical illustration showing the frequency response of a sharply tuned LC notch filter decoder after the frequency response of a pre-emphasizing amplifier has been superimposed on it.

As mentioned before, the descrambler is a sharply tuned LC notch filter also called a band elimination filter, whose frequency spectrum is symmetric about the scrambling signal. It is a completely passive device requiring no power for its operation. The ultimate attenuation of the descrambler 18 should be in excess of 60 dB at the scramble signal frequency, the notch being sufficiently wide to remove the AM sidebands of the scrambling signal, but being sufficiently narrow to prevent serious degradation of the video information. Outside the notch, the decoder impedance should provide 75 Ohm impedance match and transmission attenuation less than 1 dB. A band width of 1.25 MHz at the 3 db level is preferred. FIG. 7a shows the frequency response of the decoder, while FIG. 7b shows the frequency response of the pre-emphasizing amplifier superimposed on FIG. 7a to counterbalance any degradation caused by the decoder. It can be seen that the ultimate band width of the decoder 18 is chosen to be less than 0.75 MHz at the 3 db point.

The frequency of the scramble signal is carefully selected not only to provide maximum interference but to provide a picture having maximum quality when it is removed. The frequency of 2.25 MHz is a multiple of 60 Hz and could produce faint vertical lines in the picture if any of the interfering signal got through the descrambler 18. For this reason a slight offset is added to the 2.25 MHz frequency to make it closer to a multiple of the horizontal sweep frequency of 15.75 KHz. Thus the final selected frequency of 2.257 (offset 0.007 MHz from 2.25 MHz has the additional advantage of rendering the interfering signal horizontal or almost parallel with the horizontal lines of the picture. Thus any trace of the interfering signal not completely removed by the descrambled is rendered invisible to the naked eye.

It should be apparent from the preceeding discussion that the sole modification of the TV channel is the addition of what amounts to another carrier signal. This third carrier, the unscrambling signal does not, however, interact with the rest of the rf information in the channel, because the scrambling signal is combined with the regular transmission through a linear network.

The actual "scrambling" is accomplished by the receiver, which is unable to reconstitute a coherent TV picture while the scrambling signal is present. The scrambling signal, located as it is in the TV channel is readily processed by the line amplifiers of a cable system. It should be noted that the system of encoding and decoding described herein may be applied to other communication systems in general and is not necessarily limited to television channels. The degree of security provided by the system of this invention is more than adequate for most subscriber TV operations.

Obviously many modifications and variations of the invention are possible in the light of the above teachings. It is therefore to be understood that the full scope of the invention is not limited to the details disclosed herein and may be practiced otherwise than as specifically described herein.

What is claimed is:

1. A television security system comprising:
   processing means for processing a television signal having a video carrier and audio carrier;
   scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
   transmitting means for transmitting said scrambled television signal to television receivers;
   filter means for filtering out said at least one scramble signal from said television receiver circuits.

2. A television security system comprising:
   processing means for processing a television signal having a video carrier and audio carrier;
   scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
   transmitting means for transmitting said scrambled television signal to television receivers;
   filter means for filtering out said at least one scramble signal from said television receiver circuits;
   wherein said scramble signal generator means includes oscillator means for producing at least one scramble signal at a frequency approximately midway between the video carrier signal frequency and the audio carrier signal frequency.

3. A television security system comprising:
   processing means for processing a television signal having a video carrier and audio carrier;
   scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
   transmitting means for transmitting said scrambled television signal to television receivers;
   filter means for filtering out said at least one scramble signal from said television receiver circuits; and modulating means for modulating said at least one scramble signal at substantially 15 Hz and 1KHz.

4. A television security system comprising:
processing means for processing a television signal having a video carrier and audio carrier;
scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
transmitting means for transmitting said scrambled television signal to television receivers;
filter means for filtering out said at least one scramble signal from said television receiver circuits;
wherein the amplitude of said at least one scramble signal is at 0 db relative to the video carrier of said television signal.

5. A television security system comprising:
processing means for processing a television signal having a video carrier and audio carrier;
scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
transmitting means for transmitting said scrambled television signal to television receivers;
filter means for filtering out said at least one scramble signal from said television receiver circuits; and
phase-locking means for phase locking the at least one said scramble signal relative to said video carrier signal.

6. A television security system comprising:
processing means for processing a television signal having a video carrier and audio carrier;
scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
transmitting means for filtering out said at least one scramble signal from said television receiver circuits;
phase-locking means for phase locking the at least one said scramble signal relative to said video carrier signal;
said phase-locking means comprising:
mixer means for mixing said at least one scramble signal with a signal equal to the difference between said video carrier signal and said at least one scramble signal; and
a band pass filter connecting the output of said filter to a phase-locking loop in said processing means.

7. A television security system comprising:
processing means for processing a television signal having a video carrier and audio carrier;
scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
transmitting means for transmitting said scrambled television signal to television receivers;
filter means for filtering out said at least one scramble signal from said television receiver circuits; and
pre-emphasis amplifying means for amplifying the video carrier in a narrow band about the frequency of the at least one scramble signal.

8. A television security system comprising:
processing means for processing a television signal having a video carrier and audio carrier;
scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
transmitting means for transmitting said scrambled television signal to television receivers;
filter means for filtering out said at least one scramble signal from said television receiver circuits;
said filter means comprising:
a sharply tuned notch filter having a narrow band width approximately symmetrical about the frequency of the at least one scrambling signal.

9. The television security system according to claim 8 wherein said notch filter has an attenuation of at least minus 45 db.

10. The television security system according to claim 7 including a pre-emphasis amplifier for amplifying a video carrier in a narrow band width about the frequency of the at least one scrambling signal.

11. The television security system according to claim 10 wherein the band width of the notch filter and the pre-emphasis amplifier are approximately equal so that they counterbalance each other to minimize degradation of video information.

12. A method of securing a television channel transmission comprising:
processing a television signal having a video carrier and an audio carrier;
generating at least one scramble signal at a frequency substantially in the range of one-fourth to three-fourths of the frequency interval between the video and audio carriers of the television signal;
combining said television signal with said at least one scramble signal at the output of said processor such that the television signal is scrambled thereby;
transmitting said scrambled television signal to a plurality of television receivers;
filtering out said scramble signal from said scrambled television signal at the input to the television receivers.

13. A method of securing a television channel transmission comprising:
processing a television signal having a video carrier and an audio carrier;
generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers;

wherein the amplitude of said at least one scramble signal is at a 0 db level relative to the video carrier of said television signal.

14. A method of securing a television channel transmission comprising:

processing a television signal having a video carrier and an audio carrier;

generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers;

said step of generating the scramble signal comprising:

generating at least one scramble signal at a frequency approximately midway between the frequencies of said video carrier and audio carrier.

15. A method of securing a television channel transmission comprising:

processing a television signal having a video carrier and an audio carrier;

generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers; and modulating said at least one scramble signal at 15 Hz and 1KHz.

16. A method of securing a television channel transmission comprising:

processing a television signal having a video carrier and an audio carrier;

generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers;

said filtering step comprising:

filtering a narrow band of said video carrier at approximately −45 db.

17. A method of securing a television channel transmission comprising:

processing a television signal having a video carrier and an audio carrier;

generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers; and pre-emphasizing a narrow band of the video carrier at the frequency of the scramble signal;

said filtering step comprising:

filtering a narrow band of said video carrier at approximately −45 db;

whereby said filtering and pre-emphasis counterbalance each other to minimize degradation of the video information.

18. A method of securing a television channel transmission comprising: processing a television signal having a video carrier and an audio carrier;

generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers; and phase-locking the at least one scramble signal to the video carrier.

19. A method of securing a television channel transmission comprising:

processing a television signal having a video carrier and an audio carrier;

generating at least one scramble signal at a frequency substantially in the range of one-fourth to three-fourths of the frequency interval between the video and audio carriers of the television signal;

combining said television signal with said at least one scramble signal at the output of said processor such that the television signal is scrambled thereby;

transmitting said scrambled television signal to a plurality of television receivers;

filtering out said scramble signal from said scrambled television signal at the input to the television receivers;

phase-locking the at least one scramble signal to the video carrier;

wherein said phase-locking step comprises mixing the at least one scramble signal with a signal having a frequency equal to the difference between the scrambled signal and the video carrier;

filtering the signal received after mixing;

connecting the output of said filter to a phase-locked loop in the processor.

20. The method according to claim 19 wherein said phase-locking step includes:
 phase-locking the scrambled signal at a frequency approximately midway between the video carrier and the audio carrier.

21. A television security system comprising:
 processing means for processing a television signal having a video carrier and audio carrier;
 scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
 transmitting means for transmitting said scrambled television signal to television receivers;
 filter means for filtering out said at least one scramble signal from said television receiver circuits;
 wherein said scramble signal generator means includes oscillator means for producing at least one scramble signal at a frequency approximately midway between the video carrier signal frequency and the audio carrier signal frequency;
 wherein the frequency of the at least one scramble signal is approximately 2.25 MHz above the video carrier frequency.

22. A television security system comprising:
 processing means for processing a television signal having a video carrier and audio carrier;
 scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
 transmitting means for transmitting said scrambled television signal to television receivers;
 filter means for filtering out said at least one scramble signal from said television receiver circuits;
 wherein said scramble signal generator means includes oscillator means for producing at least one scramble signal at a frequency approximately midway between the video carrier signal frequency and the audio carrier signal frequency;
 wherein the frequency of the at least one scramble signal is selected to be closer to a multiple of the horizontal sweep frequency than the vertical frequency.

23. A television security system comprising:
 processing means for processing a television signal having a video carrier and audio carrier;
 scramble signal generating means for injecting at least one scrambling signal having a frequency between the video and audio carriers of said television signal such that said television signal is scrambled thereby, said at least one scrambling signal having a frequency substantially in the range of one-fourth to three-fourths of the frequency interval between the video carrier and the audio carrier;
 transmitting means for transmitting said scrambled television signal to television receivers;
 filter means for filtering out said at least one scramble signal from said television receiver circuits;
 wherein said scramble signal generator means includes oscillator means for producing at least one scramble signal at a frequency approximately midway between the video carrier signal frequency and the audio carrier signal frequency;
 wherein the frequency of the scramble signal is 2.257 MHz, selected to be closer to a multiple of the horizontal sweep frequency than the vertical frequency.

24. A method of securing a television channel transmission comprising:
 processing a television signal having a video carrier and an audio carrier;
 generating at least one scramble signal at a frequency substantially in the range of one-fourth to three-fourths of the frequency interval between the video and audio carriers of the television signal;
 combining said television signal with said at least one scramble signal at the output of said processor such that the television signal is scrambled thereby;
 transmitting said scrambled television signal to a plurality of television receivers;
 filtering out said scramble signal from said scrambled television signal at the input to the television receivers;
 said step of generating the scramble signal comprising:
 generating at least one scramble signal at a frequency approximately midway between the frequencies of said video carrier and audio carrier, and
 generating the at least one scramble signal at a frequency of approximately 2.25 MHz above the video carrier frequency.

25. A method of securing a television channel transmission comprising:
 processing a television signal having a video carrier and an audio carrier;
 generating at least one scramble signal at a frequency substantially in the range of one-fourth to three-fourths of the frequency interval between the video and audio carriers of the television signal;
 combining said television signal with said at least one scramble signal at the output of said processor such that the television signal is scrambled thereby;
 transmitting said scrambled television signal to a plurality of television receivers;
 filtering out said scramble signal from said scrambled television signal at the input to the television reveivers;
 said step of generating the scramble signal comprising:
 generating at least one scramble signal at a frequency approximately midway between the frequencies of said video carrier and audio carrier, and
 generating the at least one scramble signal closer to a multiple of the horizontal sweep frequency than the vertical frequency.

26. The method according to claim 25 including:
 generating the at least one scramble signal at a frequency of 2.257 MHz above the video carrier frequency.

27. A television security system comprising:
 means for generating a television signal having a video carrier and an audio carrier;
 scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby; and transmitting means for transmitting said scrambled television signal for television reception.

28. A television security system comprising:

means for generating a television signal having a video carrier and an audio carrier;

scramble signal generating means for injecting at least one scramble signal between the video and audio carriers of said television signal, having a frequency substantially midway between the video carrier signal frequency and the audio carrier signal frequency, such that said television signal is scrambled thereby; and transmitting means for transmitting said scrambled television signal for television reception.

29. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby;

transmitting means for transmitting said scrambled television signal for television reception; and modulating means for modulating said at least one scramble signal at 15 Hz and 1KHz.

30. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby; and transmitting means for transmitting said scrambled television signal for television reception;

wherein the amplitude of said at least one scramble signal is at 0 db relative to the video carrier of said television signal.

31. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby;

transmitting means for transmitting said scrambled television signal for television reception; and phase-locking means for phase locking the at least one scramble signal relative to said video carrier signal.

32. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby;

transmitting means for transmitting said scrambled television signal for television reception; and phase-locking means for phase locking the at least one scramble signal relative to said video carrier signal;

said phase-locking means comprising:

mixer means for mixing said at least one scramble signal with a signal equal to the difference between said video carrier signal and said at least one scramble signal; and a band pass filter connecting the output of said filter to phase-locked loop in said generating means.

33. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby;

transmitting means for transmitting said scrambled television signal for television reception; and pre-emphasis amplifying means for amplifying the video carrier in a narrow band about the frequency of the at least one scramble signal.

34. The invention as set forth in claim 33 including a pre-emphasis amplifier for amplifying a video carrier in a narrow band width about the frequency of the at least one scrambling signal.

35. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby;

transmitting means for transmitting said scrambled television signal for television reception; and eliminating means for eliminating said at least one scramble signal from said television signal before reception by television receiver circuits.

36. A television security system comprising:

means for generating a television signal having a video carrier and an audio carrier;

scramble signal generating means for injecting at least one scramble signal between the video and audio carriers of said television signal, said at least one scramble signal having a frequency substantially between the limits of one-fourth and three-fourths of the frequency interval between said video carrier and said audio carrier, such that said television signal is scrambled thereby;

transmitting means for transmitting said scrambled television signal for television reception;
eliminating means for eliminating said at least one scramble signal from said television signal before reception by television receiver circuits;
said eliminating means comprising a sharply tuned notch filter having a band width about the frequency of said at least one scrambling signal.

37. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television signal with said at least one scrambling signal such that the video carrier and the audio carrier are scrambled thereby.

38. The method as set forth in claim 37 wherein the step of generating the at least one scramble signal comprises:
generating the at least one scramble signal having a frequency substantially within the range of one-fourth and three-fourths of the frequency interval between the video carrier and the audio carrier.

39. A method of securing a television transmission comprising:
generating a television signal having a video carrier and an audio carrier;
generating at least one scramble signal having a frequency substantially midway between the frequency of the video carrier and the frequency of the audio carrier;
combining said television signal with said at least one scrambling signal such that the video carrier and the audio carrier are scrambled thereby.

40. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television with said at least one scrambling signal such that the video carrier and the audio carrier are scrambled thereby; and
modulating said scramble signal at substantially 15 Hz and 1KHz.

41. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television signal with said at least one scrambling signal such that the video carrier and the audio carrier are scrambled thereby; and
filtering out said scramble signal.

42. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television signal with said at least one scrambling signal such that the video carrier and the audio carrier are scrambled thereby;
filtering out said scramble signal;
said filtering step comprising filtering a narrow band of said video carrier at approximately $-45$ db.

43. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television signal with said at least one scrambling signal such that the video carrier and the audio carrier are scrambled thereby; and
pre-emphasizing a narrow band of the video carrier at substantially the frequency of the scramble signal to minimize degradation of video information.

44. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television signal with said at least one scrambling signal such that the video carrier and the audio carrier are scrambled thereby; and
phase locking the scramble signal to the video carrier.

45. A method of securing a television transmission comprising:
generating a television signal having a video carrier and an audio carrier;
generating at least one scramble signal having a frequency substantially within the range of one-fourth and three-fourths of the frequency interval between the video carrier and the audio carrier of the television signal;
combining said television signal with said at least one scrambling signal such that the video carrier and the audio carrier are scrambled thereby;
phase locking the scramble signal to the video carrier;
said phase locking step comprising mixing the scramble signal with a signal having a frequency substantially equal to the difference between the scramble signal and the video carrier, filtering the signal received after mixing, the directing the filtered signal to a phase-locked loop in the processor.

* * * * *